(12) United States Patent
Gerrard et al.

(10) Patent No.: US 6,958,874 B1
(45) Date of Patent: Oct. 25, 2005

(54) MANUFACTURE OF DATA STORAGE DEVICE

(75) Inventors: Christopher P. Gerrard, Dorset (GB); Robin J. W. Powell, Milpitas, CA (US); Daniel O Tanner, San Jose, CA (US)

(73) Assignee: Westwind Air Bearings Ltd., (GB)

( * ) Notice: Subject to any disclaimer, the term of this patent is extended or adjusted under 35 U.S.C. 154(b) by 380 days.

(21) Appl. No.: 10/088,647

(22) PCT Filed: Sep. 6, 2000

(86) PCT No.: PCT/GB00/03414

§ 371 (c)(1),
(2), (4) Date: Jul. 11, 2002

(87) PCT Pub. No.: WO01/22410

PCT Pub. Date: Mar. 29, 2001

(30) Foreign Application Priority Data

Sep. 20, 1999 (GB) .................................. 9922238
Apr. 27, 2000 (GB) .................................. 0010272

(51) Int. Cl.⁷ .......................................... G11B 19/04
(52) U.S. Cl. ................................................ 360/60
(58) Field of Search ....................... 360/60; 29/603.03

(56) References Cited

U.S. PATENT DOCUMENTS

| | | | |
|---|---|---|---|
| 3,683,273 A * | 8/1972 | Behr et al. ................. | 324/210 |
| 3,875,589 A | 4/1975 | Applequist et al. | |
| 4,509,160 A * | 4/1985 | Eggers ....................... | 360/234 |
| 4,920,434 A | 4/1990 | Brown et al. | |
| 4,920,442 A | 4/1990 | Dimmick | |
| 4,980,783 A | 12/1990 | Moir et al. | |
| 5,193,084 A | 3/1993 | Christiaens | |
| 5,617,267 A | 4/1997 | Kawagoe | |
| 5,627,698 A | 5/1997 | Malek | |
| 5,642,943 A | 7/1997 | Szeremeta | |
| 5,760,989 A | 6/1998 | Colban | |
| 5,786,963 A | 7/1998 | Malek | |
| 5,894,374 A | 4/1999 | Moraru | |
| 5,909,333 A | 6/1999 | Lee et al. | |
| 6,226,254 B1 * | 5/2001 | Komatsu et al. ............. | 369/270 |

FOREIGN PATENT DOCUMENTS

| | | | |
|---|---|---|---|
| EP | 0 321 942 A | 6/1989 | |
| GB | 2 330 189 A | 4/1999 | |

OTHER PUBLICATIONS

KLA-Tencor—Media process website: http://www.phasemetrics.com/products/me1.htm.
KLA-Tencor—DSW 105 Media-Level Servowriter website: http://www.phasemetrics.com/products/dsw105:htm.
KLA-Tencor—MC1000 Burnish/Glide/Certification System website: http://www.phasemetrics.com/products/me1000.htm.
Komag—Manufacturing Process; website: http://www.komag.com/products/manuf_10k.html.

* cited by examiner

Primary Examiner—David Hudspeth
Assistant Examiner—Glenda P. Rodriguez
(74) Attorney, Agent, or Firm—Nixon & Vanderhye P.C.

(57) ABSTRACT

A device and method for preparing media discs (2) in which servowriting and verification of the media may be carried out simultaneously. A common monolithic platform (1) is provided which supports air bearing systems which allow movement of a media disc rotary carrier (5), a servowriting headstack (3) and certifier headstack (4). Indirect drive may be provided to the rotary carrier (5) via coupling means (62).

18 Claims, 2 Drawing Sheets

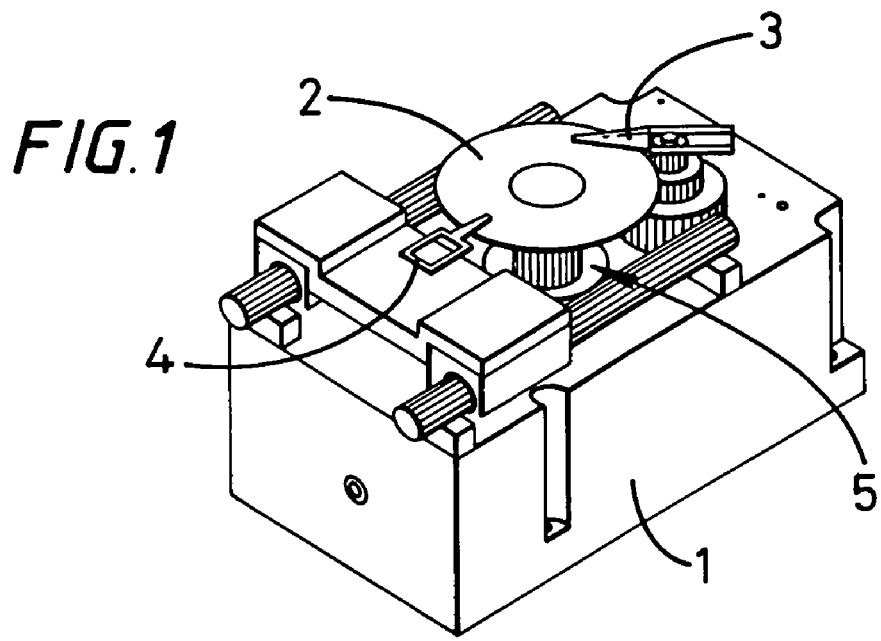
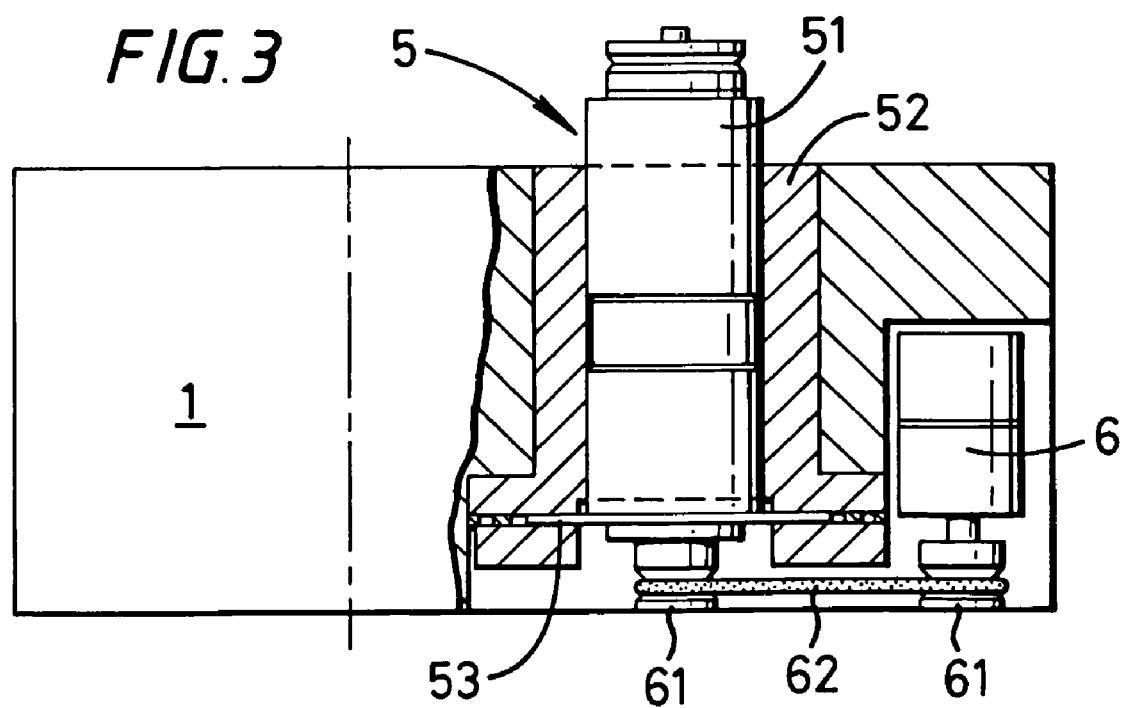

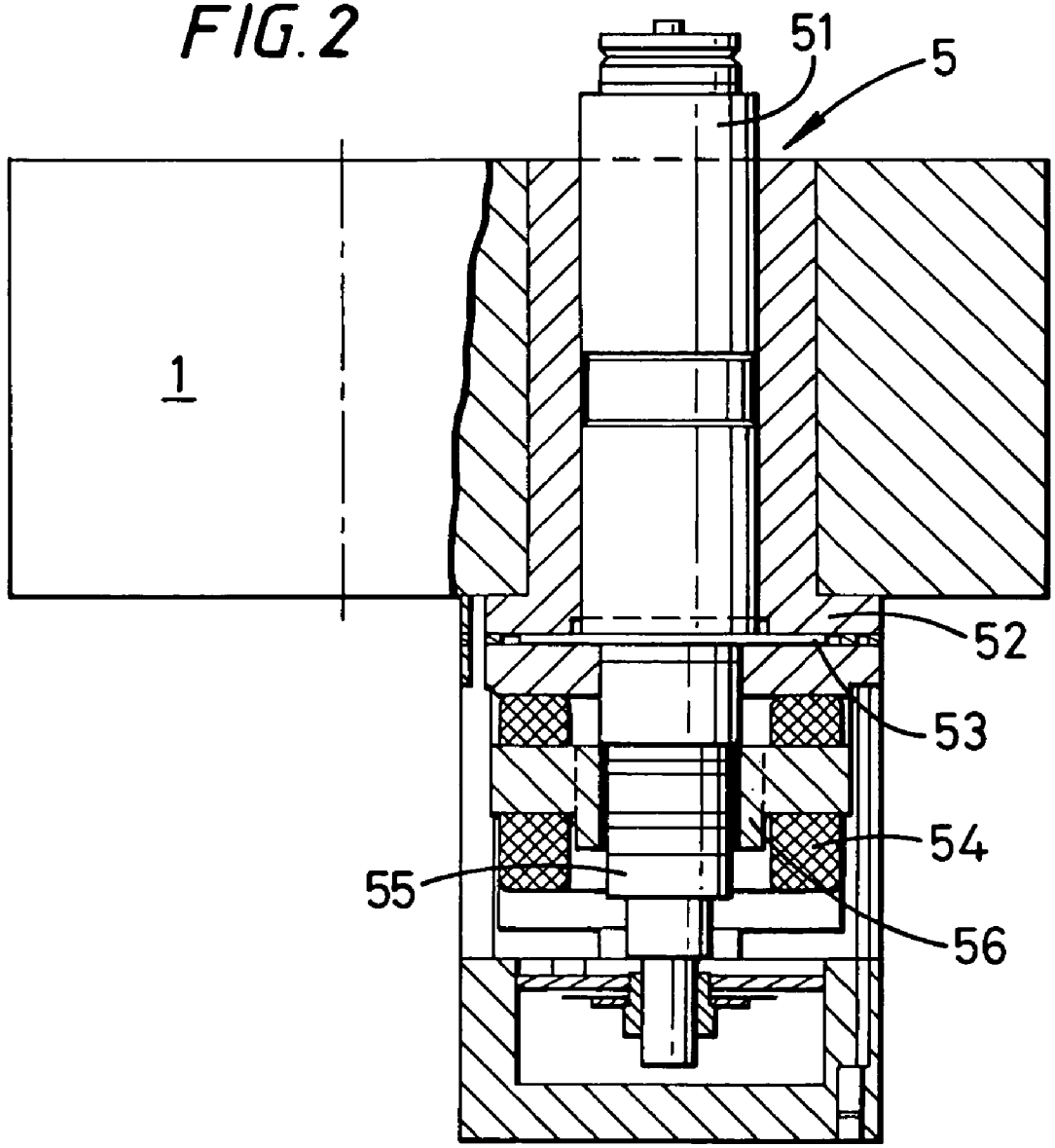

though not using the actual data path. The servowriting head 3 is thus mounted for substantially radial movement over the magnetic disc 2.

MANUFACTURE OF DATA STORAGE DEVICE

BACKGROUND AND SUMMARY OF THE INVENTION

This invention relates to the manufacture of data storage devices such as magnetically and optically written discs. Examples are hard and floppy magnetic discs as used in personal computers where the data is written in magnetically as well as CD ROMs which normally have data written in optically, i.e. usually by laser beam.

The invention relates specifically to the stage of manufacture of the storage device where indexed tracks or sectors are created. These are necessary so that the data recording and reproducing systems can identify the location of data put into and read out from the storage device. Moreover for high quality performance these indexed tracks or sectors have to be very accurately provided on the storage device.

This manufacture involves separate stages wherein the media is examined (certified) and written to (servo written). Current practice requires separate discrete pieces of equipment to perform these tasks at separate stages of manufacture.

The tasks all require the rotation of the media disc with extreme quality of motion while magnetic or other heads and sensors are moved across the surface with controlled motion, positional relationships and geometry. In this regard there are normally two separate units, one of which, generally referred to as a servo-writer writes the sectors to the disc, and the other, generally referred to as a verifier, verifies the surface(s) of the disc, usually optically.

The aim of this invention is to provide a particularly accurate and simple arrangement for performing these tasks, and accordingly the invention provides a single platform with the ability to carry all the systems required to perform these tasks, particularly to both verify the surface and write the sectors, at one stage within the manufacturing process.

Accordingly one aspect of the invention comprises a single monolithic support platform, a rotary carrier arranged for rotation of a media disc supported on said platform, a write head arranged for substantially radial movement relative to said carrier and for servo writing of data to said media disc and a certifier head arranged for substantially radial movement relative to said carrier and for verification of the media disc.

For the ultimate in quality of motion some or preferable all such motion systems should be carried on air bearings. In a preferred construction the mountings for all of these air-bearing systems should be a single and solid component incorporating the maximum rigidity providing a common datum for each discrete process.

Accordingly a preferred form of the present invention utilises a single body to carry all the air bearing systems required to perform all the processes needed for the media to be installed in a disc drive or other data storage device. All motion systems thus contained can then be capable of simultaneous operation.

Respective drive means are typically provided for driving each of the moving components, namely, the rotary carrier, the write head and certifier head. One or more of the drive means may comprise an integrated motor which is arranged for directly driving a rotary spindle, or other member, supporting the respective component. Providing integrated drive means eases manufacture and alignment of the constituent parts of the device.

One or more of the drive means may be an indirect drive means comprising a motor which is mounted independently of the respective component, and coupling means for transferring the drive to the respective component whilst minimising the transmission of any undesirable vibration. In some embodiments, the coupling means may be a resilient coupling means disposed in substantially axial alignment with a rotary spindle of the respective component. In other embodiments, the coupling means may comprise a drive belt.

It is particularly preferred that indirect drive means are provided for driving the rotary carrier carrying the media disc. The use of indirect drive means can allow substantial mechanical isolation of the motor from sensitive parts of the device. In particular, the indirect drive can help to prevent harmful vibrations being transmitted to the media disc or the servowriter head, which might otherwise cause track errors.

According to another aspect of the invention there is provided a method of preparing media storage discs comprising the steps of mounting a media disc on a rotary carrier supported on a platform, verifying the integrity of the mounted media disc using a certifier head and servowriting data to the mounted media disc with the write head without removing the media disc from the rotary carrier between the verifying and servowriting steps.

According to yet another aspect of the invention there is provided a device for preparation of a media storage disc comprising a single monolithic support platform, a rotary carrier arranged for rotation of a media disc supported on said platform, a write head arranged for substantially radial movement relative to said carrier and for servo writing of data to said media disc, a certifier head arranged for substantially radial movement relative to said carrier and for confirming the integrity of the medium of the disc and indirect drive means for driving the rotary carrier, the drive means comprising a motor mounted independently of the rotary carrier, and coupling means for transmitting the drive to the rotary carrier whilst minimizing the transmission of any undesirable vibration.

BRIEF DESCRIPTION OF THE DRAWINGS

Embodiments of invention will now be described, by way of example only, with reference to the accompanying drawings in which:

FIG. 1 shows a perspective view of a combination magnetic disc servowriter and certifier platform;

FIG. 2 is a schematic side view of part of the platform shown in FIG. 1, the platform being partly shown in section; and FIG. 3 is a schematic side view of part of an alternative platform, the alternative platform being partly shown in section.

DETAILED DESCRIPTION

Referring particularly to FIG. 1, in a first embodiment, a common monolithic platform 1 is provided in the form of a single piece of material integrally forming a base support for three separate air bearing motion systems thereby guaranteeing the positional relationship of each to the media being processed. This media in the form of a magnetic disc 2 is mounted on a motorised spindle 5 with integral position feedback and disc clamping.

A servowriting headstack 3 is mounted on a rotary spindle carried by an air bearing and is geometrically positioned in relation to the media spindle 5 so as to mimic the final data storage product take off read-rotation relationship. It is fitted with an integral accurate motion actuator and fittings for a separate position sensor. The monolithic platform 1 acts as a spindle block for both the disc carrier and the servowriting headstack spindles.

A certifier headstack 4 is mounted on a linear air-bearing supported slide with integral linear motor and fittings for a separate position sensor. However, this motion system could also be of rotary design. In such a case the monolithic platform would also act as a spindle block for the certified headstack spindle.

FIG. 2 is a schematic side view of part of the device shown in FIG. 1, part of the platform 1 being shown in section to more clearly show the motorised spindle 5 used for carrying the magnetic disc 2. The magnetic disc 2 and selected other parts of the device are omitted in FIG. 2 for the sake of simplicity.

The motorised spindle 5 generally comprises a rotary spindle or shaft 51 mounted in an air bearing 52 for rotation and axially supported by an axial bearing 53. Rotational drive of the rotary spindle 51 is provided by an integral motor. The integral motor comprises a stator 54 and a rotor 55 which carries a plurality of permanent magnets 56 and which is formed integrally with the rotary spindle 51. Thus a direct drive is provided to the rotary carrier of the magnetic disc 2. It can be noted that all of the rotary carrier, the servowriting headstack and certified headstack are mounted on the support platform 1.

FIG. 3 is a schematic side view of part an alternative embodiment. The alternative embodiment is similar to that described above except that the rotary carrier of the magnetic disc is indirectly driven. Again, in FIG. 3, part of the platform 1 is shown in section to more clearly show the motorised spindle 5, whilst the magnetic disc 2 and selected other parts of the alternative device are omitted for the sake of simplicity.

In the alternative embodiment, the motorised spindle 5 similarly comprises a rotary spindle or shaft 51 mounted in an air bearing 52 for rotation and axially supported by an axial bearing 53. However rotational drive of the rotary spindle 51 is provided by an independent motor 6. The independent motor 6 is mounted on the support platform 1 but independently of the rotary spindle 51. Drive is transferred to the rotary spindle by way of a pair of pulleys 61 and a drive belt 62. Thus an indirect drive is provided to the rotary carrier of the magnetic disc 2 which can help to avoid undesirable vibrations being transmitted to the media disc or servo writing headstack.

In alternatives, a different form of drive coupling may be provided between an independent motor and the rotary carrier of the magnetic disc. This may take the form of a resilient solid or a fluid based coupling. Typically such a coupling will be disposed in alignment with both the axis of the rotary carrier and the axis of the motor.

In other alternatives, the independent motor in an indirect drive device can be mounted externally, and/or entirely independently of the monolithic platform block.

In further alternatives, one or more of the motion systems may not be of an air bearing design but some form of mechanical device.

In operation of any of the embodiments described above, a newly machined and finished disc or stack of discs will be loaded onto the media spindle disc clamp, after which the spindle will spin up to the operating speed. The servowriting and certifying tasks are completely independent and may be carried out in any order or simultaneously. However, the certifying process, which is typically an optical examination of the disc surfaces, can be conducted much more quickly (in the order of 20 seconds) than the servowriting (say 20 minutes). Thus it is sensible to either certify first or simultaneously with the start of the servowriting process. Preferably the servowriting and certifier headstacks will start their motion simultaneously allowing the integrity of the medium to be confirmed and the servo pattern to be written onto the disc. If the certifier identifies a faulty disc the process will be stopped and the disc discarded. After the process is complete the media will be ready for assembly into a disc drive or other data storage device. Using a device of the type described herein, it is possible to achieve track densities in the order of 40,000 tracks per inch.

Although not described in detail, systems similar to those described and within the scope of the present invention can be used for processing other types of media discs.

What is claimed is:

1. A device for preparation of a media storage disc comprising a single monolithic support platform, a rotary carrier arranged for rotation of a media disc supported on said platform, a write head arranged for substantially radial movement relative to said carrier and for servo writing of data to said media disc and a certifier head arranged for substantially radial movement relative to said carrier and for verification of the media disc.

2. A device to claim 1 in which the rotary carrier, the write head and the certifier head are all carried on air bearing systems.

3. A device according to claim 2 in which mountings for each of said air bearing systems are formed within said single monolithic support platform, thereby ensuring a common datum for both writing to and verifying the disc.

4. A device according to claim 2 in which at least one of the air bearings comprises a rotary spindle, and an associated indirect drive arrangement is provided for driving the spindle, the drive arrangement comprising a motor mounted independently of the respective spindle and coupling for transmitting the drive to the respective spindle whilst minimising the transmission of any undesirable vibration.

5. A device according to claim 2 in which at least one of the air bearings comprises a rotary spindle, and associated indirect drive arrangement is provided for driving the spindle, the indirect drive arrangement comprising a motor mounted independently of the respective spindle and a drive belt for transmitting the drive to the rotary spindle.

6. A device according to claim 1 comprising an indirect drive arrangement for driving the rotary carrier, the drive arrangement comprising a motor mounted independently of the rotary carrier, and a coupling for transmitting the drive to the rotary carrier whilst minimising the transmission of any undesirable vibration.

7. A device according to claim 6 in which the coupling comprises a resilient coupling disposed in substantially axial alignment with the rotary carrier.

8. A device according to claim 6 in which the coupling comprises a drive belt.

9. A device according to claim 1 comprising an indirect drive arrangement for driving the rotary carrier, the drive arrangement comprising a motor mounted independently of the rotary carrier, and a drive belt for transmitting the drive to the rotary carrier.

10. A device according to claim 1 which is arranged for writing to and verifying at least one of a hard magnetic disc, a floppy magnetic disc, and a CD Rom.

11. A device according to claim 1, wherein said certifier head is arranged for confirming the integrity of the medium of the disc.

12. A method of preparing media storage discs comprising the steps of mounting a media disc on a rotary carrier supported on a platform, verifying the integrity of the mounted media disc using a certifier head and servowriting data to the mounted media disc with a write head without removing the media disc from the rotary carrier between the verifying and servowriting steps.

13. A device for preparation of a media storage disc comprising a single monolithic support platform, a rotary carrier arranged for rotation of a media disc supported on said platform, a write head arranged for substantially radial movement relative to said carrier and for servo writing of data to said media disc, a certifier head arranged for substantially radial movement relative to said carrier and for confirming the integrity of the medium of the disc, and indirect drive means for driving the rotary carrier, the drive means comprising a motor mounted independently of the rotary carrier, and coupling means for transmitting the drive to the rotary carrier whilst minimizing the transmission of any undesirable vibration.

14. A device according to claim 13 in which the coupling means comprises a resilient coupling means disposed in substantially axial alignment with the rotary carrier.

15. A device according to claim 13 in which the coupling means comprises a drive belt.

16. A device according to claim 13 in which at least one of the rotary carrier, the certified head and the write head is carried on an air bearing.

17. A device for preparation of a media storage disc comprising:
    a single monolithic support platform, a rotary carrier supported on said platform and arranged for rotation of a media disc on an air bearing system, the carrier being driven by a motor mounted independently of the rotary carrier and arranged to drive the carrier via a resilient coupling;
    a write head arranged for substantially radial movement relative to said carrier and for servowriting of data to said media disc, the write head being carried on an air bearing system; and
    a certifier head arranged for substantially radial movement relative to said carrier and for confirming the integrity of the medium of the disc.

18. A device for preparation of a media storage disc comprising:
    a single monolithic support platform, a rotary carrier supported on said platform and arranged for rotation of a media disc on an air bearing system, the carrier being driven by a motor mounted independently of the rotary carrier and arranged to drive the carrier via a drive belt;
    a write head arranged for substantially radial movement relative to said carrier and for servowriting of data to said media disc, the write head being carried on an air bearing system; and
    a certifier head arranged for substantially radial movement relative to said carrier and for confirming the integrity of the medium of the disc.

* * * * *